(12) United States Patent
Nauka et al.

(10) Patent No.: US 11,697,153 B2
(45) Date of Patent: Jul. 11, 2023

(54) MATERIAL SETS

(71) Applicant: HEWLETT-PACKARD DEVELOPMENT COMPANY, L.P., Spring, TX (US)

(72) Inventors: Krzysztof Nauka, Palo Alto, CA (US); John Samuel Dilip Jangam, Palo Alto, CA (US); Kristopher J. Erickson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,406

(22) PCT Filed: Jun. 1, 2018

(86) PCT No.: PCT/US2018/035654
§ 371 (c)(1),
(2) Date: Oct. 15, 2019

(87) PCT Pub. No.: WO2019/231467
PCT Pub. Date: Dec. 5, 2019

(65) Prior Publication Data
US 2021/0323068 A1    Oct. 21, 2021

(51) Int. Cl.
*B22F 10/14* (2021.01)
*B33Y 10/00* (2015.01)
(Continued)

(52) U.S. Cl.
CPC ............... *B22F 1/17* (2022.01); *B22F 1/052* (2022.01); *B22F 1/105* (2022.01); *B22F 10/14* (2021.01);
(Continued)

(58) Field of Classification Search
CPC .................................. B22F 1/17; B22F 10/14
See application file for complete search history.

(56) References Cited

U.S. PATENT DOCUMENTS 5,240,742 A      8/1993  Johnson et al.
5,372,845 A  *  12/1994  Rangaswamy ........... B22F 9/04
                                                              427/242
(Continued)

FOREIGN PATENT DOCUMENTS

DE         2448738        4/1976
JP     2006-257463 A     9/2006
(Continued)

OTHER PUBLICATIONS

Malvern: "A basic guide to particle characterization", Dec. 31, 2015 (Dec. 31, 2015).
(Continued)

*Primary Examiner* — Anthony J Zimmer
*Assistant Examiner* — Jacob J Gusewelle
(74) *Attorney, Agent, or Firm* — HP Inc. Patent Department

(57) ABSTRACT

The present disclosure is drawn to a material set including a powder bed material and a binder fluid. The powder bed material can be from 80 wt % to 100 wt % metal particles having a metal core and a thin metal layer on the core, and the metal particles having a D50 particle size distribution value ranging from 4 μm to 150 μm and the thin metal layer having an average thickness from 20 nm to 2 μm. The binder fluid can adhere a first portion of the powder bed material relative to a second portion of the powder bed material not in contact with the binder fluid.

18 Claims, 4 Drawing Sheets

(51) Int. Cl.
- *B33Y 30/00* (2015.01)
- *B33Y 70/00* (2020.01)
- *B22F 12/43* (2021.01)
- *B22F 12/63* (2021.01)
- *B22F 10/28* (2021.01)
- *B22F 1/052* (2022.01)
- *B22F 1/105* (2022.01)
- *B22F 1/17* (2022.01)
- *B33Y 70/10* (2020.01)

(52) U.S. Cl.
CPC .............. *B22F 10/28* (2021.01); *B22F 12/43* (2021.01); *B22F 12/63* (2021.01); *B33Y 10/00* (2014.12); *B33Y 30/00* (2014.12); *B22F 2301/35* (2013.01); *B22F 2304/10* (2013.01); *B33Y 70/00* (2014.12); *B33Y 70/10* (2020.01)

(56) References Cited

U.S. PATENT DOCUMENTS

| | | | |
|---|---|---|---|
| 9,095,900 B2 | 8/2015 | Hertter et al. | |
| 2006/0045787 A1* | 3/2006 | Jandeska | B33Y 10/00 419/47 |
| 2014/0072823 A1 | 3/2014 | Hertter et al. | |
| 2015/0221850 A1 | 8/2015 | Watanabe et al. | |
| 2016/0339517 A1* | 11/2016 | Joshi | B22F 1/0007 |
| 2017/0072471 A1 | 3/2017 | Welch et al. | |
| 2017/0175234 A1* | 6/2017 | Jennett | C22C 30/00 |

FOREIGN PATENT DOCUMENTS

| | | | | |
|---|---|---|---|---|
| WO | WO-9325336 | | 12/1993 | |
| WO | WO2007039450 A9 | | 5/2008 | |
| WO | WO-2016004448 A1 | | 1/2016 | |
| WO | WO-2016152023 | | 9/2016 | |
| WO | WO-2016152023 A1 | * | 9/2016 | ............ B22F 3/1055 |
| WO | WO2017178319 A1 | | 10/2017 | |
| WO | 2018/017130 A1 | | 1/2018 | |
| WO | WO-2018017130 A1 | * | 1/2018 | .............. B22F 3/008 |

OTHER PUBLICATIONS

Renliang Xu et al: "Comparison of sizing small particles using different technologies", Powder Technology, Elsevier, Basel (CH), vol. 132, No. 2-3, Jun. 24, 2003 (Jun. 24, 2003), pp. 145-153.

Zhang Yi et al: Additive Manufacturing of Metallic Materials: A Review, Journal of Materials Engineering and Performance, ASM International, Materials Park, OH, US, vol. 27, No. 1, May 24 2017 (May 24, 2017), pp. 1-13.

"The Theory and Technology of Ferroalloy Production" Aug. 31, 1994 Gasik, Metallurgical Industry Press, pp. 570-574 (with English Translation).

* cited by examiner

MATERIAL SETS

BACKGROUND

Three-dimensional printing, sometimes referred to as 3D printing, can be used for rapid prototyping and/or additive manufacturing (AM), and can involve computer controlled processes by which a printer transforms materials into a three-dimensional physical object. Methods of 3D printing have continued to develop over the last few decades and include, but are not limited to selective laser sintering, selective laser melting, electron beam melting, stereolithography, fused deposit modeling, as well as others. The demand for new techniques and materials for 3D printing continues to increase as applicable areas of use likewise continue to expand and evolve.

DETAILED DESCRIPTION

Figure 1:
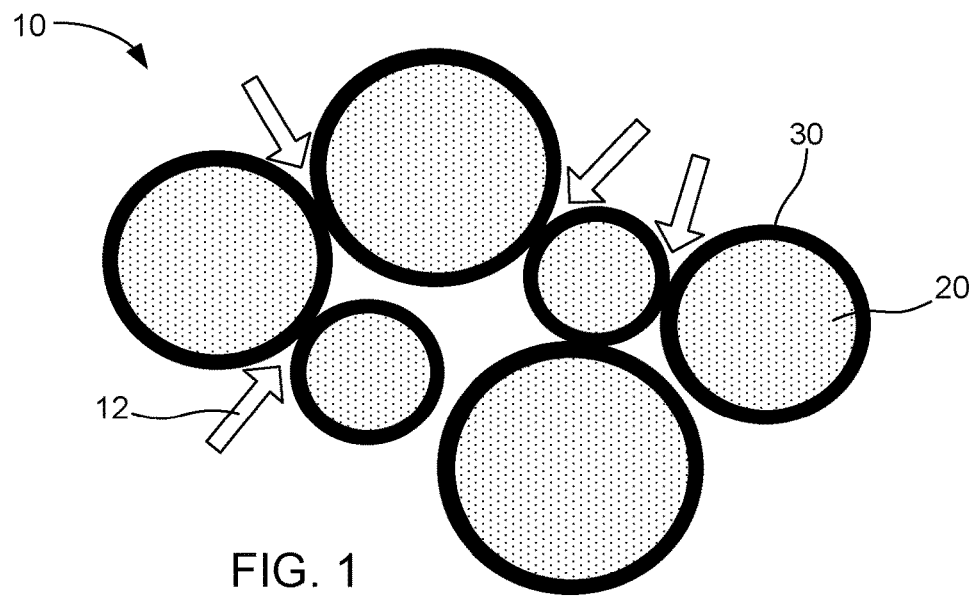
FIG. 1 schematically depicts a cross-sectional view of example locations where individual metal particles having a metal core and a thin metal layer thereon can be sintered together to form connection bridges with adjacent metal particles in accordance with the present disclosure.

In accordance with the present disclosure, three-dimensional printing of metal articles can involve heating metal powder in order to sinter or melt metal particles to form a fused article. In further detail, three-dimensional printing can be carried out using metal particles of a powder bed material and selectively printing or ejecting a binder fluid onto portions of the powder bed material in a layer by layer manner, e.g., spreading powder bed material followed by applying binder fluid and repeating, to form a green part. The green part or object can then be sintered or annealed to form the final metal part, e.g., the green object moved to an oven (or remain in place) to be heat fused. Particularly in examples where the binder fluid carries a binder polymer, such as latex particles or some other type of polymer or polymerizable material, the polymer can burn off, e.g., burnout, at a relatively low temperature during the sintering or annealing process. Thus, if metal particle sintering does not begin to occur near this relatively low temperature where the binder is burned off or becomes otherwise ineffective or decomposed, there may be a temperature gap (and thus a time gap) between the time at which the polymer becomes ineffective and sintering of the metal particles together begins. This can lead to the collapse or partial collapse of parts, particularly in the case of metal particles with particularly high sintering temperatures, e.g., Fe, Ni, Cu, Ti alloys, etc., which sinter at temperatures above 1000° C., for example. Furthermore, even when using metal oxide binders rather than polymer binders that may be devoid of polymer or include only small amounts of polymer, there can be a temperature range where binding strength may be insufficient to maintain a desired shape of printed object due to insufficient density of binding contact between the powder particles or excessive thermal stresses associated with the presence of binding material.

In the present disclosure, powder bed material can be used which includes metal particles that have a metal core (elemental metal or metal alloy) with a thin layer of a different metal (elemental metal or metal alloy) applied thereon. The combination of the thin metal layer and the metal core can often generate a lower heat fusing temperature (or melting temperature) at the surface of the metal particles compared to the same metal particles of only the metal core material without a thin metal layer thereon. This can reduce or eliminate the temperature gap between when the polymer binder becomes ineffective and the metal particles begin to sinter together. Likewise, if using thermally sensitive metal oxide binder/reducing agent system as the binder fluid rather than a polymer binder, the thin metal coating can also improve binding strength when binding between the thin coating layers is more likely to form than between the core metal particles.

In accordance with this, the present disclosure is drawn to material sets, methods of three-dimensional printing, and three-dimensional printing systems. A material set, for example, can include a powder bed material. The powder bed material can have from 80 wt % to 100 wt % metal particles having a metal core and a thin metal layer on the core. The metal particles can have a D50 particle size distribution value ranging from 4 μm to 150 μm and the thin metal layer having an average thickness from 20 nm to 2 μm. In further detail, the material set can include a binder fluid to provide particle adhesion to a first portion of the powder bed material relative to a second portion of the powder bed material not in contact with the fluid. In one example, to bind the metal particles together, the binder fluid can include a binder such as a polymer binder or a polymerizable binder material. In another example, the binder fluid can include water, dispersed metal oxide nanoparticles, and a reducing agent to reduce the dispersed metal oxide nanoparticles when external energy is applied to the binder fluid, e.g., heat and/or photo energy. In this example, the binder fluid can be stable at room temperature, and the metal oxide nanoparticles can be reduced by the reducing agent when the external energy is applied. The metal core can be aluminum, titanium, copper, cobalt, chromium, nickel, vanadium, tungsten, tungsten carbide, tantalum, molybdenum, magnesium, gold, silver, stainless steel, steel, alloys thereof, or admixtures thereof. The thin metal layer can be, in one example, a ferro-alloy, and in another example, an elemental metal. Other metals and alloys can likewise be used for either the metal core or the thin metal layer. The metal particles can alternatively include, for example, multiple types of thin metal layers, which are either present as: i) multiple layers on a single metal core (e.g., see FIG. 4), or ii) single layers on different respective metal cores (e.g., see FIG. 3). In another example, a melting temperature of the thin metal layer in centigrade can be lower than a melting temperature of the metal core, e.g., from 20% to 90% of the melting temperature of the metal core. In further detail, upon application of external energy, a metal material of the thin metal layer can in-diffuse into the metal core forming a diffusion alloy having a lower melting temperature than the metal core. In further detail, there can even be examples where the alloy formed by in-diffusion can also have a melting temperature lower than the thin metal layer.

A method of three-dimensional printing can include spreading a powder bed material to form a powder layer having a thickness of from 20 μm to 400 μm. The powder bed material can include from 80 wt % to 100 wt % metal particles having a metal core and a thin metal layer on the core. The metal particles can have a D50 particle size distribution value ranging from 4 μm to 150 μm and the thin metal layer can have an average thickness from 20 nm to 2 μm. The method can further include selectively binding a first portion of the powder bed material to form a green layer and building up additional green layers by sequentially repeating the spreading and the selectively binding of the powder bed material until a green three-dimensional object is formed. In another example, when forming the green object, flash heating can be carried out (e.g., by applying a pulse or multiple pulses of light energy which includes both photo energy and applies heat), with respect to the powder bed material after ejecting to form the green layer prior to spreading an additional layer of powder bed material. In one example, the method can include heat fusing the green three-dimensional object to sinter or anneal the metal particles together. The term "flash heating" or application of "pulse energy" refers to applying short duration photo energy (which also provides heat) to individual powder bed material layers to promote green layer binding during forming the green object. The term "heat fusing" refers to the process of heating and apply photo energy to the green object in a sintering or annealing oven to cause the metal particles to become fused together, forming connection bridges and in some instances causing metal diffusion from one or more material into another. Thus, in further detail, the method can also include heat fusing the green three-dimensional object at a temperature to cause a metal material of the thin metal layer to diffuse with the metal core forming a diffusion alloy having a lower melting temperature than the metal core. In still another example, the metal particles can include multiple types of thin metal layers, which are either present as: i) multiple layers on a single metal core, or ii) single layers on different respective metal cores.

In another example, a three-dimensional printing system can include a powder bed material, a powder bed for receiving the powder bed material, and a fluid ejector to selectively deposit a binder fluid onto the powder bed material contained in the powder bed. The powder bed material can include from 80 wt % to 100 wt % metal particles having a metal core and a thin metal layer on the core. The metal particles can have a D50 particle size distribution value ranging from 4 μm to 150 μm and the thin metal layer having an average thickness from 20 nm to 2 μm. The metal core can be, for example, aluminum, titanium, copper, cobalt, chromium, nickel, vanadium, tungsten, tungsten carbide, tantalum, molybdenum, magnesium, gold, silver, stainless steel, steel, alloys thereof, or a mixture thereof.

The thin metal layer can be, in certain examples, an elemental metal or a ferro-alloy. Furthermore, a melting temperature of the thin metal layer in centigrade can be from 20% to 90% of a melting temperature of the metal core.

It is noted that when discussing the material sets, methods of three-dimensional printing, or the three-dimensional printing systems of the present disclosure, each of these discussions can be considered applicable to other examples whether or not they are explicitly discussed in the context of that example. Thus, for example, in discussing a reducing agent related to the material sets, such disclosure is also relevant to and directly supported in context of the methods or systems, and vice versa.

Turning now to example details related to the material sets, as mentioned, the material sets can include a powder bed material and a binder fluid. The powder bed material can include from 80 wt % to 100 wt % metal particles, from 90 wt % to 100 wt % metal particles, from 99 wt % to 100 wt % metal particles or can essentially be composed of all metal particles. If the powder bed material is not 100 wt % metal particles, then other material that may be present can include metal particles that do not include a thin metal layer, smaller metal particles, salts, filler material, or the like. The metal particles in the present disclosure can have a metal core with a thin layer of a different metal applied thereon. The combination of the thin metal layer and the metal core can provide more effective particle fusing at lower temperatures compared to particles of the only metal core without any thin metal coating. For example, the thin metal coating can have a melting temperature that is lower than the melting temperature of the metal core, and thus, the thin metal layers melt at a lower temperature and provides binding at the thin metal layer. In other examples, the metal material of the thin metal coating can diffuse into the metal core and form a diffusion alloy (upon heating, for example), and the diffusion alloy can have a melting temperature lower than the melting temperature of the metal core, and in some instances, lower than the melting temperatures of both the metal core and the thin metal layer if melted alone. Furthermore, core particles can be coated randomly with different metals or according to known ratios of different metal coatings, and when mixed together and heated, metal particles coated with different metal layers can come into contact to form a diffusion alloy with a lower melting temperature than either or both of the different respective metal layers, e.g., a first metal layer material diffuses into a second metal coating material, or vice versa. Any combination of these variables can likewise be implemented in accordance with examples of the present disclosure. Regardless, these mechanisms can provide for lower processing temperatures, e.g., binding temperatures if using metal oxide binder and/or sintering temperatures.

As mentioned, the metal particles include a metal core and a thin metal layer applied to the core. The metal core can be, for example, aluminum, titanium, copper, cobalt, chromium, nickel, vanadium, tungsten, tungsten carbide, tantalum, molybdenum, magnesium, gold, silver, stainless steel, steel, alloys thereof, or admixtures thereof. In many examples, the metal core can include a transition metal, but there are examples where the metal does not include a transition metal, such as in the case of aluminum; or in other examples, the metal can be an alloy of multiple metals or can include a metalloid(s). To illustrate, the alloy may be steel or stainless steel. Even though steel includes carbon, it is still considered to be metal in accordance with examples of the present disclosure because of its metal-like properties and the presence of a significant portion of elemental metal.

Other metal alloys that may include some carbon or small amounts of non-metal dopant, metalloid, impurities, etc., can also be considered to be a "metal" in accordance with the present disclosure as well. Examples of elements that can be included in metal alloys or blends include H, C, N, O, F, P, S, CI, Se, Br, I, At, noble gases (He, Ne, Ar, Kr, Xe, Rn), etc. Metalloids that can be included in some examples include B, Si, Ge, As, Sb, etc. More generally, a "metal" can be an elemental metal or alloy that exhibits properties generally associated with metals in metallurgy, e.g., malleability, ductility, fusibility, mechanical strength, high melting temperature, high density, high heat and electrical conduction, sinterable, etc. This definition is applicable both to the metal core, or the thin metal layer described in greater detail hereinafter.

Turning now to the thin metal layer, this layer can be of a metal material having a lower melting point than that of the metal core, for example. Thus, the thin metal layer can be, for example, zinc, copper, tin, aluminum, some other metal suitable for reducing the fusing temperature of the metal particles relative to the fusing or melting temperature of the metal core, or alloy thereof. Though elemental metals like zinc, copper, tin, aluminum, etc., can be used, in one example, a metal alloy can be used for the thin metal layer. Examples of metal alloys that can be used to form the thin metal layer, including their respective melting temperatures, include ferro-aluminum (1225-1275° C.), ferro-boron (1450-1550° C.), ferro-chromium (1350-1675° C.), ferro-manganese (1060-1225° C.), ferro-molybdenum/molybdic oxide (1665-1715° C.), ferro-niobium (1500-1550° C.), ferro-phosphorus (1250-1350° C.), ferro-silicon (1225-1325° C.), ferro-silicon-manganese (1130-1230° C.), ferro-silicon-magnesium (1210-1250° C.), ferro-silicon-zirconium (1250-1340° C.), ferrous sulfide (1150-1200° C.), ferro-titanium (1070-1480° C.), ferro-vanadium (1695-1770° C.), and ferro-tungsten (1650-2100° C.). The melting temperature ranges are exemplary and can be adjusted in some instances within these ranges based on relative metal weight ratios, grade of material, etc.

These metal particles can exhibit good flowability within the powder bed material. The shape type of the metal particles can be spherical, irregular spherical, rounded, semi-rounded, discoidal, angular, subangular, cubic, cylindrical, or any combination thereof, to name a few. In one example, the metal particles can include spherical particles, irregular spherical particles, rounded particles, or other particle shapes that have an aspect ratio from 1.5:1 to 1:1, from 1.2:1, or about 1:1. In some examples, the shape of the metal particles can be uniform or substantially uniform, which can allow for relatively uniform melting or sintering of the particulates after the three-dimensional green part or object is formed and then heat fused in a sintering or annealing oven, for example. The particle size distribution can also vary. As used herein, particle size refers to the value of the diameter of spherical particles, or in particles that are not spherical, can refer to the longest dimension of that particle. The particle size can be presented as a Gaussian distribution or a Gaussian-like distribution (or normal or normal-like distribution). Gaussian-like distributions are distribution curves that may appear essentially Gaussian in their distribution curve shape, but which can be slightly skewed in one direction or the other (toward the smaller end or toward the larger end of the particle size distribution range). That being stated, an exemplary Gaussian distribution of the metal particles can be characterized generally using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile size. For example, a D50 value of 25 µm means that 50% of the particles (by number) have a particle size greater than 25 µm and 50% of the particles have a particle size less than 25 µm. A D10 value of 10 µm means that 10% of the particles are smaller than 10 µm and 90% are larger than 10 µm. A D90 value of 50 µm means that 90% of the particles are smaller than 50 µm and 10% are larger than 50 µm. Particle size distribution values are not necessarily related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can still be considered to be essentially referred to as "Gaussian" as used conventionally.

In accordance with this, in one example, the metal particles can have a D50 particle size distribution value ranging from 4 µm to 150 µm, from 20 µm to 100 µm, or from 30 µm to 80 µm, for example. In another example, the metal particles can have a D10 particle size distribution from 5 µm to 50 µm, or from 10 µm to 30 µm. In still further detail, the metal particles can have a D90 particle size distribution from 25 µm to 85 µm, or from 35 µm to 75 µm, for example.

The metal cores can be produced using any manufacturing method. However, in one example, the metal particles can be manufactured by a gas atomization process. During gas atomization, a molten metal is atomized by inert gas jets into fine metal droplets that cool while falling in an atomizing tower. Gas atomization can allow for the formation of mostly spherical particles. In another example, the metal particles can be manufactured by a liquid atomization process. The coating or thin metal layer can be applied to the metal core by any of a number of methods, such as evaporation or sputtering, for example.

By way of example, FIGS. 1-4 depict various metal particles 10 in accordance with the present disclosure. FIG. 1, for example depicts metal particles of various sizes within a Gaussian or Gaussian-like distribution of particles sizes, e.g., D50 particle size distribution value ranging from 4 µm to 150 µm. The individual metal particles include a metal core 20 and a thin metal layer 30. Arrows 40 are shown at locations where bridges (shown as dotted lines) can occur due to metal particle proximity, e.g., touching particles. For example, a powder bed material of metal particles with a stainless-steel metal core with a copper, zinc, tin, ferro-alloy, etc., thin metal coating can be sintered and form connecting bridges as shown in FIG. 1. The thin metal coating can be in the form of deposited metal nanoparticles, or a continuous coating of metal in other examples. In some examples, sintering can be followed by the thin metal layer melting to form even more substantial connecting bridges binding adjacent particles.

Figure 2:
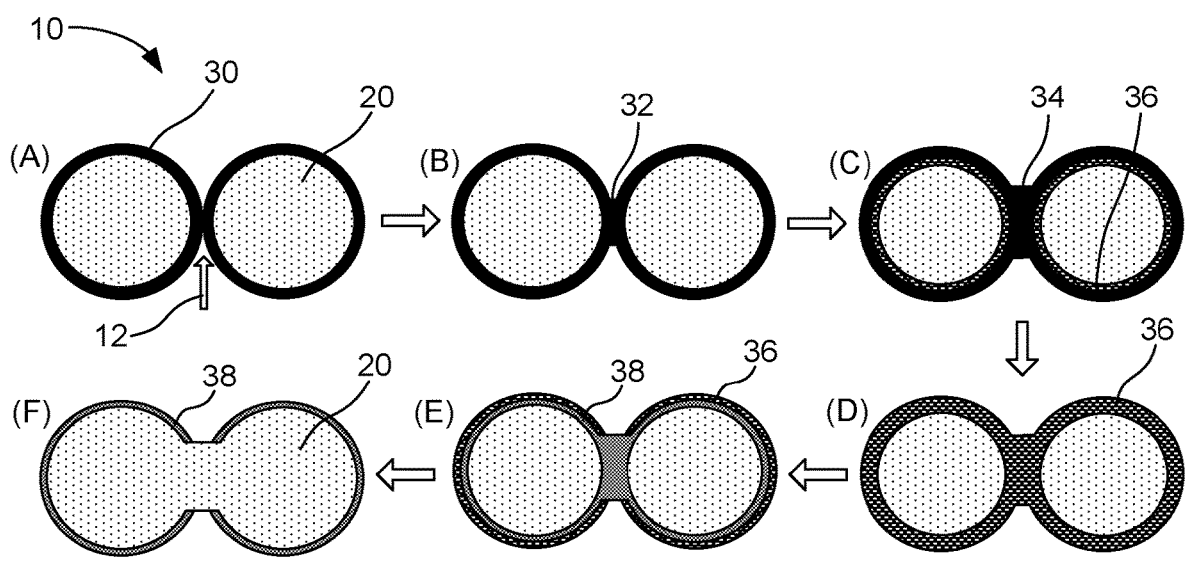
FIG. 2 schematically depicts a cross-sectional view of an example fusion progression of adjacent metal particles through sintering and connection bridge formation as well as the progression of metal diffusion between the thin metal layer and the metal core of metal particles in accordance with the present disclosure.

As another example, as shown more specifically in FIG. 2, sintering can lead to diffusion of the metal(s) at an interface where the metal core 20 and the thin metal layer 30 are in contact. Phases A-F are shown by way of example to illustrate the progression of sintering and the formation of bridges 32, which may begin to form a phase B as shown or may form at a later phase in other examples such as after a diffusion alloy 36 begins to form as shown in phase C, or after the diffusion alloy reaches a surface of the metal particles as shown in phase D. The "diffusion alloy" can be defined as the alloy formed at a shallow region where the thin metal layer and the metal core are in contact with one another and subjected to heat. The diffusion alloy, in some examples, may reach the surface of the metal particles, as shown at phase D. In some examples, the melting temperature of the diffusion alloy at this region can be reduced, allowing for the initiation of sintering at the diffusion alloy regions at a lower temperature than would otherwise occur with the metal core metal material. In some more specific examples, the melting and/or sintering temperature at this diffusion alloy region may even be lower than the melting and/or sintering temperature of the thin metal layer. Even further temperature increases may bring the metal particles into the thermal range where the diffusion alloyed surface regions more easily sinter or even start liquefying, and the metal core may then start sintering as well. Phases E and F show further examples with a secondary diffusion alloy 38 that may even start to form between the metal core and the diffusion alloy, or perhaps between a secondary metal that may be initially present in the metal core or thin metal coating as an alloy (initially present in the metal particle prior to sintering). In one specific example, comparing the melting temperatures of the four materials shown in FIG. 2, if the metal core is defined as having a first melting temperature ($T1_{melt}$), and the thin metal layer is defined as having a second melting temperature ($T2_{melt}$) that is lower than $T1_{melt}$, than the diffusion alloy melting temperature ($T3_{melt}$) and the secondary diffusion alloy melting temperature ($T4_{melt}$) may have relative melting temperatures according to Formula I, as follows:

$$T1_{melt} > T4_{melt} > T3_{melt} > T2_{melt} \quad \text{Formula I}$$

In accordance with Formula I, there may be instances where temperatures are applied to achieve phase B, phase C, phase D, phase E, or phase F. Thus, the phases shown in FIG. 2 are provided by way of example to illustrate that temperature can be used to modulate metal sintering and/or melting, and in many instances, adequate bridge formation can occur with the metal particles of the present disclosure at temperatures well below the temperature that would otherwise be used for a metal particle of a single metal or metal alloy without a thin metal layer applied thereto.

With further detail regarding diffusion, by way of example, a copper thin metal layer may diffuse into a stainless-steel metal core, and melting where fusion can occur (relative to the stainless steel) of copper-rich alloy may be reduced by 50° C. to 300° C. or more. Likewise, as zinc diffuses into stainless steel, the melting point (relative to the stainless steel) may be reduced by 50° C. to 400° C. or more. For example, alloy containing 50% zinc may have a melting temperature that is close to 300° C. lower than pure Fe. In other examples, if the thin metal layer is an alloy, such as a ferro-alloy, different melting and/or sintering behaviors can be leveraged. For example, with a stainless steel core and an iron-selenium alloy thin metal layer, both the metal core and the thin metal layer are alloys initially. By using a ferro-alloy as the thin metal layer, the melting point of the thin metal layer can be lowered as it interacts with adjacent particles or its own metal core. In some cases, the ferro-alloy can even have a higher melting temperature than iron, and the melting temperature can be lowered as it interacts with more iron from the stainless-steel metal core. In other cases, the ferro-alloy can have a lower melting point than iron and can provide a lower melting temperature at the coating for building initial connecting bridges. With specific reference to the iron-selenium ferroalloys, this unique alloy at certain ratios can exhibit a melting temperature suppressed to as low as 500° C., e.g., at around the Fe:Se atomic ratio of about 48:52, and can still be suppressed significantly outside of this specific atomic ratio. For example, at Fe:Se atomic ratios where the iron concentration is below 50 at %, the melting temperature can be relatively low as well, e.g., less than about 1100° C. In further detail, at an Fe:Se atomic ratio of about 35:65 to about 12:88, the melting temperature can be relatively low as well, e.g., less than about 1000° C.

Regardless of the metals or alloys chosen for use initially in the metal particles and the sintering or melting temperatures applied thereto, these thermal phases may facilitate formation of more effective mechanical bonding between the adjacent metal particles, even at lower temperatures. This can prevent, for example, collapse or partial collapse of the printed object when heated in a sintering or annealing oven, for example. It is noted that the progression of sintering, bridge formation, and/or diffusion alloy formation, etc., shown in FIG. 2 is by way of example only. Other metal combinations may present different progressions or may not present the various phases shown. The diffusion alloys (or mixed phase(s)) may occur prior to the bridge formation in some examples, or the diffusion may not occur at the processing temperatures in other examples, e.g., thin metal coating melts and forms bridges without any appreciable diffusing into the metal core. Regardless, as long as good contact bridges between adjacent particles are formed upon applying sintering temperatures, a solid metal part or object can be formed that is rigid and sturdy. That stated, in examples of the present disclosure, the metal particles can allow this to occur at lower temperatures, thus reducing problems associated with collapse after binder burnout or other issues introduced at higher processing temperatures. It is noted that the thin metal layer and subsequent diffusion alloy thicknesses are exaggerated in FIG. 2 for purposes of illustration.

Figure 3:
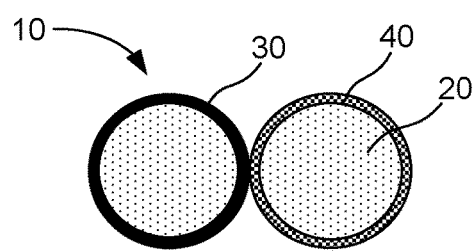
FIG. 3 schematically depicts a cross-sectional view of two example adjacent metal particles with the same metal core but with different respective thin metal layers in accordance with the present disclosure.
Figure 4:
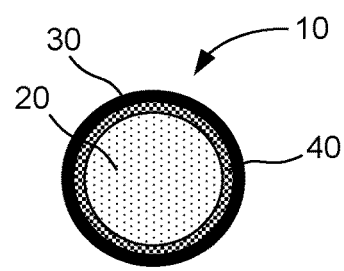
FIG. 4 schematically depicts a cross-sectional view of an example metal particle with multiple thin metal layers in accordance with the present disclosure.

In more specific examples, additional enhancements to the powder bed materials and material sets may be provided by utilizing various types of thin metal layer materials, such as that shown by way of examples in FIGS. 3 and 4. In FIGS. 3 and 4, there are two different types of thin metal layers present. More specifically, the metal core 20 can include a first thin metal coating 30 and/or a second thin metal coating 40. The first thin metal coating can be present on one metal core and the second thin metal coating can be present on another metal core, as shown in FIG. 3. In this example, diffusion alloys can form between the respective thin metal coatings and their metal core, but also, diffusion alloys can also form between the two touching adjacent thin metal layers. These diffusion alloys where the thin metal coatings contact one another can provide lower temperatures at which contact bridges may be formed, for example. Alternatively, the first and second thin metal coatings can be present as layers on a single metal core, as shown in FIG. 4. In this example, the second (or outermost) thin metal coating may have the lowest melting temperature and the metal core may have the highest melting temperature, with ascending melting temperatures between the metal core and the outermost thin metal coating. In this example, there is only one thin metal coating between the metal core and the outermost thin metal layer, but there could be multiple thin metal coating layers therebetween. This configuration, for example, may provide for the building of connection bridges between particles in a manner that is even more efficient, taking advantage of a multitude of diffusion alloys, including binary, ternary, or quaternary diffusion alloy compounds that may form as the temperature is raised.

In further detail, in addition to the powder bed material, the material set can include binder fluid, which can include any of a number of binders carried by a liquid vehicle for dispensing on the powder bed material as described herein. The term "binder" includes material used to physically bind separate metal particles together or facilitate adhesion to a surface of adjacent metal particles to a green part or object in preparation for subsequent sintering or annealing. The binder fluid can provide binding to the powder bed material upon application, or in some instances, can be further treated after printing to providing binding properties, e.g., exposure to flash heating (photo energy and heat) to activate a reducing agent, exposure to UV or IR energy to initiate polymerization, etc. A "green" part or object (or individual layer) refers to any component or mixture of components that is not yet sintered or annealed. Once the green part or object is sintered or annealed, the part or object can be referred to as a "brown" object or part. "Sintering" refers to the consolidation and physical bonding of the metallic particles together (after temporary binding using the binder fluid) by solid state diffusion bonding, partial melting of one or more phases or metal particles present, or a combination of solid state diffusion bonding and partial melting. The term "anneal" refers to a heating and cooling sequence that controls not only the heating process, but the cooling process, e.g., slowing cooling in some instances, to remove internal stresses and/or toughen the sintered part or object (or "brown" part) prepared in accordance with examples of the present disclosure. Furthermore, for some coated metal particles, the thin metal layer can be prepared so that the presence of polymeric binder can be eliminated altogether. In other words, the binder fluid in some examples can be free of polymeric binder.

With more specific reference to the various types of binder fluid that can be used, in one example, the binder fluid can include a polymeric binder that provides the binding properties when ejected or printed onto the powder bed material. The polymer can be, for example, a latex polymer that is fluid-jettable from a fluid ejector, such as a piezo or thermal inkjet pen. Example latex polymer particle size can be from 10 nm to 200 nm, and the concentration of the latex particles in the binder fluid can be from 0.5 wt % to 20 wt %, for example. Other binder fluids may include prepolymer material that may be polymerized after ejection onto the powder bed material. In one example, the binder fluid may include water soluble acrylate- or methacrylate-based monomer carried by an aqueous liquid vehicle. For example, a binder fluid may include a monofunctional acrylate- or methacrylate-based monomer, a water soluble difunctional acrylate- or methacrylate-based monomer, an amine, and water. For example, the monofunctional monomer can be 2-hydroxy ethyl methacrylate (IEEMA) or other similar monomer, and the difunctional monomer can be glycerol dimethacrylate or other similar monomer. An example amine that can be used is N,N-dimethyl-4-ethyl benzoate or other similar amine compound. In some examples, an initiator can be present, such as a photoinitiator (e.g. UV or IR) for initiating the reaction of the various monomers and amines, etc., during layer by layer binder fluid deposition. Other polymers that may be suitable for use in the binder fluid can include poly(meth)acrylates, polyvinyl alcohols, polyvinyl acetates, polyvinyl pyrrolidones, polyvinyl butyrals, etc. Organo-metallic polymers, polysilanes, polycarbosilanes, polysilazanes, waxes, or other similar binder material can also be formulated into the binder fluids of the present disclosure. With polymeric binder fluids, typically, the binder contained therein can undergo a burnout process where the polymer essentially burns off during the sintering or annealing process. The term "burnout" refers to thermal binder burnout where thermal energy to a green part or object removes inorganic or organic volatiles and/or other materials that may be present. Burnout may result in some or all of the non-metal material to be removed. In some systems, burnout may not occur, such as in the instance where the binder is a metal oxide and the reducing agent is consumed in the redox-reaction.

In further detail, regarding the binder fluid, it is notable that there can be multiple binder fluids used in some examples, and/or the binder fluid can include more than one binder material. With multiple binder fluids, the various types of binders carried by the multiple binder fluids, respectively, can be selected to provide multistep binding. For example, a first binder may melt and bind within a relative low temperature range, and as the temperature rises and the first binder fails, the second binder may then melt and start to contribute to the binding within a second range of temperatures, and so forth, e.g., two binders, three binders, four binders, etc. In the present disclosure, even if the highest melting temperature binder were to fail before the metal core were to reach sintering temperatures, the thin metal coatings described herein can close the temperature gap between the highest binder melting temperature and the sintering temperature.

In other examples, binder fluids may be prepared that do not rely on polymers for providing the binding properties prior to sintering. These systems can include some (reduced concentration) of polymer or can be devoid of polymer altogether. For example, the binder fluid can be a thermally sensitive binder fluid that includes an aqueous liquid vehicle, a reducible metal compound, and a thermally activated reducing agent. In this example, the water can be present at from 20 wt % to 95 wt %, from 30 wt % to 80 wt % water, or from 50 wt % to 80 wt %. The reducible metal compound can be present at from 2 wt % to 40 wt %, from 7 wt % to 30 wt %, or from 10 wt % to 35 wt %. The thermally activated reducing agent can be present at from 2 wt % to 40 wt %, from 7 wt % to 30 wt %, or from 10 wt % to 35 wt %.

When selecting or formulating a thermally sensitive binder fluid to use with the powder bed material, and particularly the metal particles of the powder bed material, in one specific example, a reducible metal compound can be selected that will work well to bind the metal particles together even when there may be little to no traditional polymeric binder material present. For example, the metal particles may include a first metal material as the metal core, a second metal material as the thin metal layer, and the reducible metal compound may include a common metal found somewhere in the metal particle, e.g., in the thin metal layer, or if there may be metal diffusion that occurs as the metal particles are heated, then even in the metal core. To illustrate, if stainless steel is used as the metal core, and a ferro-alloy of iron and selenium is used for the thin metal layer, then the reducible metal compound may be an iron oxide or salt, or a chromium oxide or salt, for example (as chromium is present in the stainless steel and there may be some diffusion between the metal core and the thin metal layer). That being stated, in other examples, metals of different types can also be used. Considering the stainless-steel example, the reducible metal compound may be, for example, a copper oxide. In still other examples, if the thin metal layer is elemental copper, then copper oxide may likewise be a good choice for the reducible metal compound. These are just a few examples of combinations that can be implemented in accordance with the present disclosure.

In further detail, the reducible metal compound can be reduced by hydrogen released from the thermally activated reducing agent. Another possible mechanism can include the formation of radicals that attack the metal compound (e.g., metal oxide) and reduce it to a pure metal. Decomposition of the reactive agent can be very fast or instantaneous, driven by the high energy pulse (highly thermodynamically non-equilibrium process) and it may produce transient moieties capable of attacking the metal compounds. Examples of reducible metal compounds can include metal oxides (from one or more oxidation state), such as a copper oxide, e.g., copper I oxide or copper II oxide; an iron oxide, e.g., iron(II) oxide or iron(III) oxide; an aluminum oxide, a chromium oxide, e.g., chromium(IV) oxide; titanium oxide, a silver oxide, zinc oxide, etc. As a note, due to variable oxidation states of transition metals, they can form various oxides in different oxidation states, e.g., transition metals can form oxides of different oxidation states.

Other examples can include organic or inorganic metal salts. In particular, inorganic metal salts that can be used include metal bromides, metal chlorides, metal nitrates, metal sulfates, metal nitrites, metal carbonates, or a combination thereof. Organic metal salts can include chromic acid, chrome sulfate, cobalt sulfate, potassium gold cyanide, potassium silver cyanide, copper cyanide, copper sulfate, nickel carbonate, nickel chloride, nickel fluoride, nickel nitrate, nickel sulfate, potassium hexahydroxy stannate, sodium hexahydroxy stannate, silver cyanide, silver ethansulfonate, silver nitrate, sodium zincate, stannous chloride (or tin(II) chloride), stannous sulfate (or tin(II) sulfate, zinc chloride, zinc cyanide, tin methansulfonate, for example. In some instances, the reducible metal compound can be in the form of a nanoparticle, and in other instances, the reducible metal compound can be disassociated or dissolved in the aqueous liquid vehicle, e.g., copper nitrate or copper chloride. As nanoparticles, the reducible metal compound can have a D50 particle size from 10 nm to 1 µm, from 15 nm to 750 nm, or from 20 nm to 400 nm. In some instances, small nanoparticles can be used, such as those from 10 nm to 200 nm. Thermally sensitive binder fluids can be digitally ejectable from a fluid ejector with reliability, such as a piezoelectric fluid ejector or even a thermal fluid ejector in some examples.

The reducing agent can be particularly sensitive to rapidly applied elevated temperatures and may also be activated by a photochemical reaction introduced by flash heating. The term "flash" heating (or fusion) or application of "pulse energy" refers to raising a temperature of a surface layer of a powder bed material using photo energy while in contact with a binder fluid printed thereon (or therein) in a duration of few (or less) milliseconds. Flash heating can be tuned, for example, to have little to no impact on the already applied underlying green layer or powder bed material of the printed object, except in some instances perhaps to assist in adhering a newly formed layer to the subsequently applied and flash heated layer. Flash heating can, in other examples, have some impact on lower layers, depending on the material and the layer thickness. Example pulse energies that can be irradiated by a flash or pulse light source, particularly when the binder includes a reducible metal compound and a reducing agent, can be from 15 J/cm$^2$ to 50 J/cm$^2$ (positioned from 5 mm to 150 mm away from the powder bed material), or from 20 J/cm$^2$ to 40 J/cm$^2$. For example, the light source can be a non-coherent light source such as a pulsed gas discharge lamp. In further detail, the light source can be a commercially available xenon pulse lamp. The light source can alternatively be capable of emitting a pulse energy at an energy level(s) from 20 J/cm$^2$ to 45 J/cm$^2$. In other examples the light source can be positioned at from 25 mm to 125 mm, 75 mm to 150 mm, 30 mm to 70 mm, or 10 mm to 20 mm away from the powder bed material during operation. It should also be noted that pulsing the light energy (or flash heating) can be based on a single pulse or repeated pulses as may be designed for a specific application or material set to advance the biding properties of the printed binder fluid, e.g., initiate polymerization, initiate redox reaction. To illustrate, a higher energy single pulse may be enough to cause a fast-redox reaction to occur, or multiple lower energy pulses can likewise be used if a slower redox reaction may be desired (per layer), e.g., from 2 to 1000 pulses, from 2 to 100 pulses, from 2 to 20 pulses, from 5 to 1000 pulses, from 5 to 100 pulses, etc.

Example thermally activated reducing agents can include hydrogen ($H_2$), lithium aluminum hydride, sodium borohydride, a borane (e.g., diborane, catecholborane, etc.) sodium hydrosulfite, hydrazine, a hindered amine, 2-pyrrolidone, ascorbic acid, a reducing sugar (e.g., a monosaccharide), diisobutylaluminium hydride, formic acid, formaldehyde, or mixtures thereof. The choice of reducing agent can be such that it is thermally activated as may be dictated by the choice of the thermally reducible metal compound, e.g. to keep the metal oxide or salt primarily in its native or original state (as an oxide or salt) until their reaction with the reducing agent is desired at the elevated temperatures described herein, e.g., at flash heating. If the reducing agent and the metal oxide or salt is too reactive, e.g., at room temperature, the reducible metal compound (oxide or salt) can become reduced prematurely in the binder fluid leaving behind reduced metal nanoparticles that could easily degrade by contact with air/moisture.

In this specific example, the binder fluid of this type, if used, can be referred to as a "thermally sensitive" binder fluid, meaning the metal oxide or salt is not reduced until printed in a powder bed material and then exposed to rapid heat increases by flash heating. That being stated, some polymers in binder fluids can also be thermally sensitive, in that they melt above application temperature to provide binding properties. Thus, flash heating can be used for thermally sensitive and/or photoreactive binder fluids that include polymeric binder as well. If using flash heating for causing a reducing agent to react with a reducible metal compound, e.g., metal oxide, the powder bed material having the binder fluid printed to a layer thereof can be exposed to high temperatures, such as an essentially instantaneous high reaction temperature, e.g., from 200° C. to 1000° C., from 250° C. to 1000° C., from 300° C. to 700° C., etc. Polymer binders can be exposed to these types of temperatures as well, but in some examples, lower temperature ranges with lower limits can be used as well, e.g., from 80° C. to 600° C., from 100° C. to 500° C., from 200° C. to 400° C., etc. With the binder fluids that include polymer binder, other methods of heating can be used, as in some cases, the temperatures may be lower and more easily raised to applicable softening and/or melting temperatures. Regardless, if using flash heating, raising the temperature rapidly can accelerate melting and/or redox-reaction that may occur to cause binding of powder bed material to occur.

Flash heating (using a flash pulse power source, for example) can generate high temperatures with efficiency, as a flash heating process can be tuned to facilitate heating to any temperature above room temperature up to even a melting temperature of many metals. That being mentioned, reducing the reducible metal compound in the presence of a thermally sensitive reducing agent can be carried out at a temperature well below the melting temperature of the metal, thus providing metal binder to join or adhere powder bed metal particles together in a sufficiently strong manner to allow for further processing, e.g., oven heating, sintering, annealing, etc.

In further detail, in order to generate three-dimensional printed parts, such as green parts or finished heat fused parts, three-dimensional powder-bed printing can be carried out a layer at a time. To illustrate, a layer of the powder bed material can be deposited and spread out evenly on a substrate, e.g., a build platform, a previously applied layer of powder bed material, or a previously formed green layer, typically evenly at the top surface. The layer of powder bed material can be from 25 µm to 400 µm, from 75 µm to 400 µm, from 100 µm to 400 µm, 150 µm to 350 µm, or from 200 µm to 350 µm, for example. The thickness of the layer can be determined in part based on the powder bed material particle size or particle size distribution, e.g., D50 particle size, etc., and/or upon the desired resolution of the printed part, and/or the amount of binder fluid applied to (or into) an uppermost layer of the powder bed material. Next, the binder fluid can then be selectively printed on a portion of the powder bed material in a desired pattern corresponding to a layer of the three-dimensional part or object to be printed. This can be carried out at a relatively low temperature (temperature typically below 200° C.). Notably, elevated temperature can provide some removal (evaporation) of volatile liquid components of the binder fluid, e.g., elevated above about 100° C. Next, the powder bed material layer printed with binder fluid, in some instances, can be processed further, e.g., exposed to UV or IR energy to initiate polymerization, flash heated by exposing to a pulse of light or optical energy to initiate polymerization or initiated a redox-reaction, etc. Once the three-dimensional green part or object is formed, the green part or object can be transferred or otherwise heated in a more traditional oven, such as an annealing oven or a sintering oven. There, the metal particles of the powder bed material (bound together with one or more of the various binders or binder systems, e.g., binder fluid with energy input, etc.) can become sintered together, or otherwise form a more permanent structure or rigid metal part or object (or "brown" part) compared to the green part. In the sintering or annealing oven, volatile byproducts not already removed during printing, e.g., typically below 200° C., may be further removed as the temperature increases.

Figure 5:
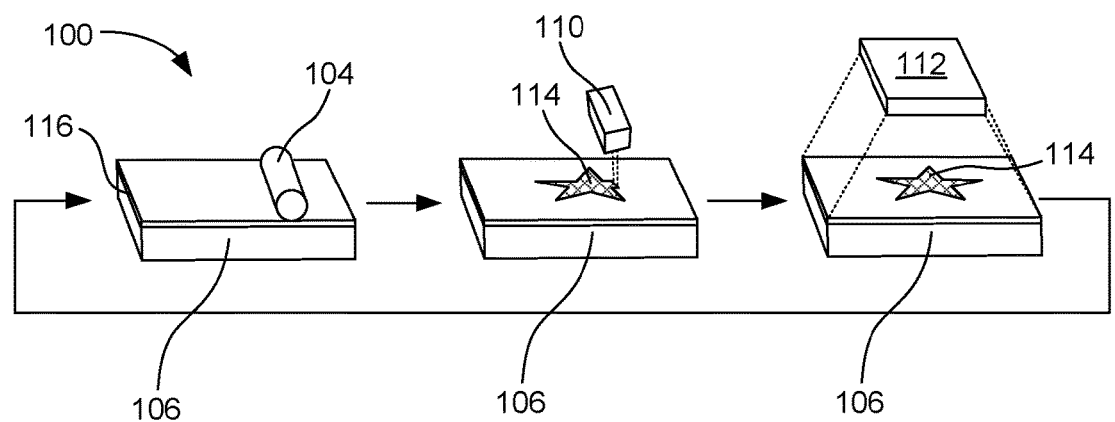
FIG. 5 schematically depicts an isometric view of an example system for three-dimensional printing in accordance with the present disclosure.

To provide some examples by way of illustration, FIG. 5 depicts a three-dimensional printing system 100 where a powder bed material 106, which include metal particles with a metal core (not shown, but shown in FIGS. 3-6) and a thin metal layer (not shown, but shown in FIGS. 3-6), can be used to prepare three-dimensional green parts. To begin (or continue) printing the part, a new top layer 116 of powder bed material is applied to an existing substrate 106 (either the build platform that supports the powder bed material, or previously deposited powder bed material, or previously generated green layer), and in this example, is flattened using a roller 104. A binder fluid, which is contained and printed from a fluid ejector 110, such as a digital inkjet pen, can then be applied to the top layer of the powder bed material in a pattern 114 which corresponds to a layer of the three-dimensional object that is being built. In some examples, where applicable, the top layer of powder bed material with the binder fluid printed thereon (or within some or all of the top layer) can then be exposed to energy from an energy source 112 to cause the binder fluid to bind the powder bed material together at the pattern (and not outside of the pattern). In one example, the energy can be IR or UV energy suitable to initiate binder polymerization, flash heating energy from a flash heating light source, e.g., a xenon lamp, etc. As a note, in some examples, additional energy may be added, and in other examples, may not be added above the thermal energy that may already be present during printing, e.g., up to 200° C. The process can then be repeated to generate a three-dimensional green part or object that can be later heat fused in an oven or by some other heating technique.

Figure 6:
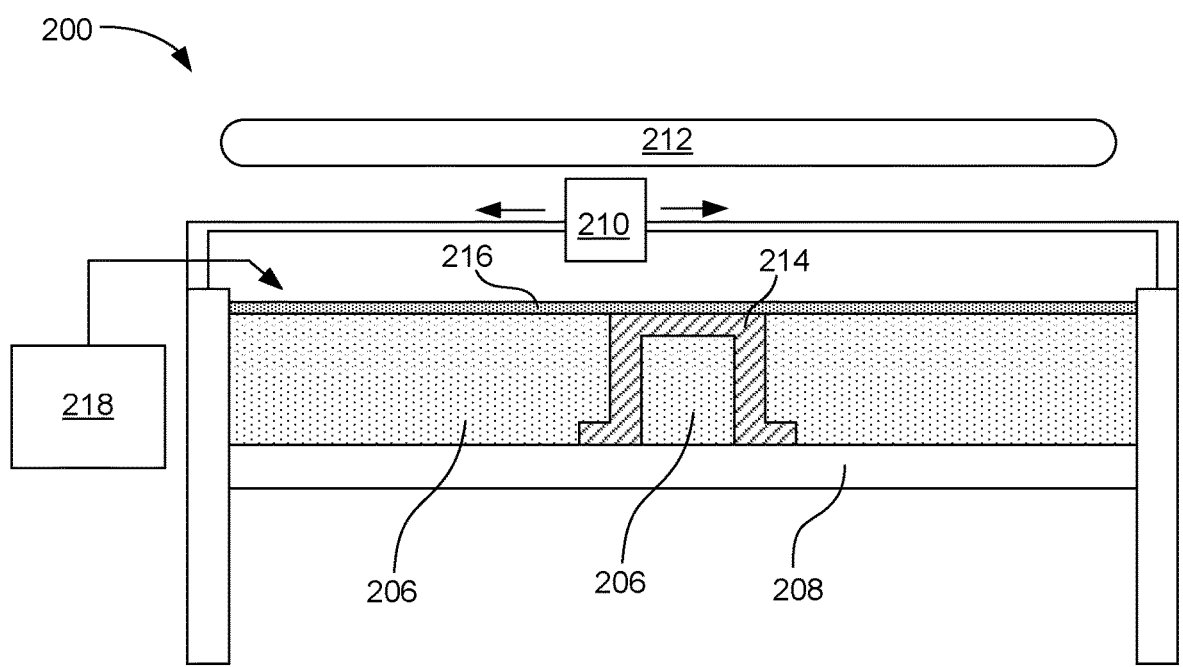
FIG. 6 schematically depicts a cross-sectional view of an alternative example system for three-dimensional printing in accordance with the present disclosure.

FIG. 6 illustrates schematically a related three-dimensional printing system 200 in accordance with examples of the present disclosure. In this FIG., the system can include a powder bed material 206 (of the metal particles), a build platform 208, a fluid ejector 210, an energy source 212 for generating and applying energy to the powder bed material, e.g., after application of a binder fluid from the fluid ejector, and a powder material source 218 for supplying a new layer 216 of powder bed material for facilitating the build. In this example, the build platform acts as the substrate for the first layer applied, and layers of powder bend material and green part or object layer act as the substrate for subsequently applied powder bed material layers. Thus, the term "build platform" can refer to a rigid substrate that is used to support powder bed material during the three-dimensional printing process. The build platform can have side walls, for example, to retain the powder bed material, in one example. The more generic term "substrate," on the other hand, can refer to a build platform, powder bed material that may have already been deposited to the build platform, or any previously deposited powder bed material that has been bound together by the binder fluid to form a green layer of the green part or object that is being formed. In this example, for reference, a printed article 214 is also shown that can be printed using the present layer by layer printing process. As shown, the powder bed material (either bound together using the binder fluid or as unprinted free flowing powder bed material) can sequentially support new layers during the build process. The powder bed material can be spread as a 25 µm to 400 µm layer of the powder bed material in the powder bed. Then the fluid ejector can eject a fluid over selected surface regions of the powder bed material, and then, in some instances, additional energy can be applied to heat or initiate a reaction at the powder bed material.

Figure 7:
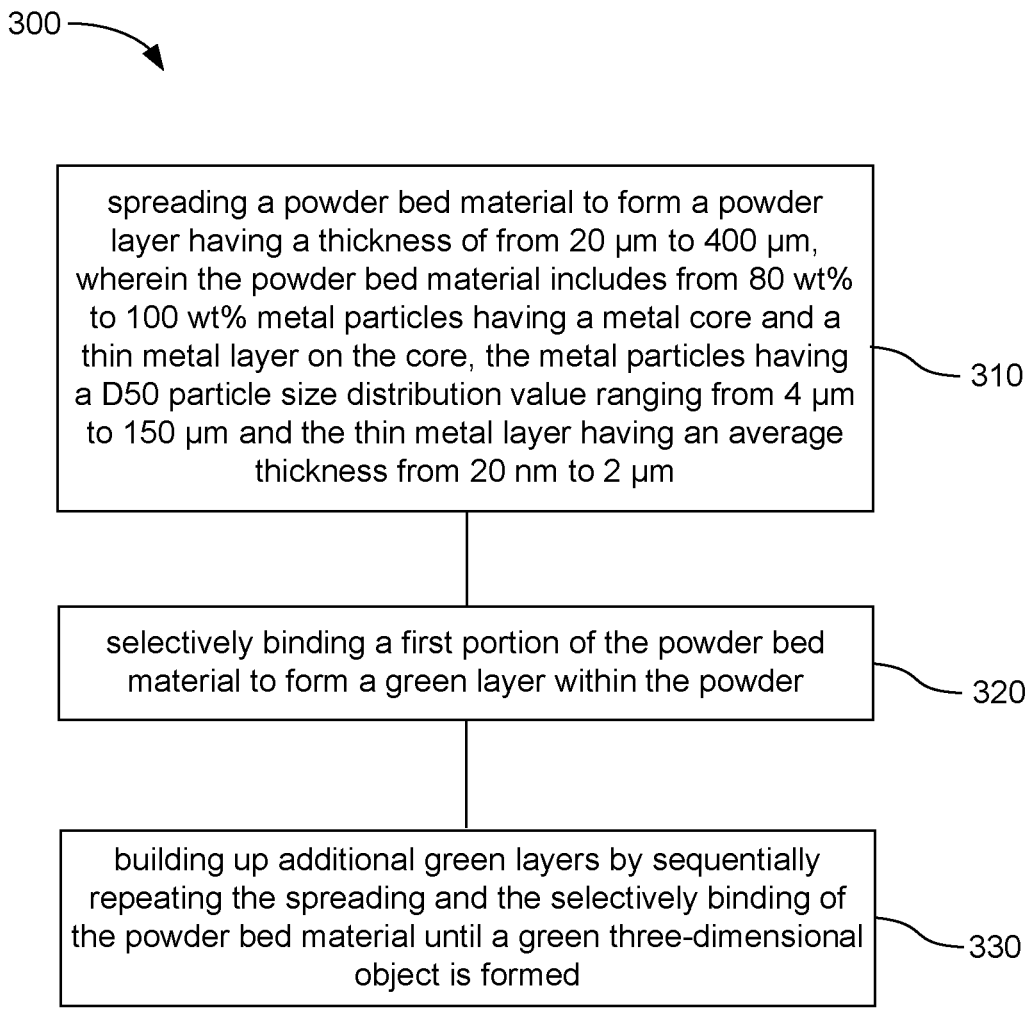
FIG. 7 is a flow diagram of an example method of three-dimensional printing in accordance with the present disclosure.

FIG. 7 depicts a method of three dimensional printing 300, which can include spreading 310 a powder bed material to form a powder layer having a thickness of from 20 µm to 400 µm, e.g. on a substrate. The powder bed material can include from 80 wt % to 100 wt % metal particles having a metal core and a thin metal layer on the core. The metal particles can have a D50 particle size distribution value ranging from 4 µm to 150 µm and the thin metal layer having an average thickness from 20 nm to 2 µm. The method can further include selectively binding 320 a first portion of the powder bed material to form a green layer within the powder, and building up 330 additional green layers by sequentially repeating the spreading and the selectively binding of the powder bed material until a green three-dimensional object is formed. The process steps and materials can be any of those described herein as well as others.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, "aspect ratio" refers to an average of the aspect ratio of the collective particles as measured on the individual particle by the longest dimension in one direction and the longest dimension in a perpendicular direction to the measured dimension.

"Particle size" refers to the diameter of spherical particles, or to the longest dimension of non-spherical particles.

As used herein, "first" and "second" are not intended to denote order. These terms are utilized to distinguish an element, component, or composition from another element, component, or composition. Thus, the term "second" does not infer that there is a "first" within the same compound or composition, but rather it is merely a "second" element, compound, or composition relative to the "first."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of 1 wt % to 20 wt % should be interpreted to include not only the explicitly recited limits of 1 wt % and 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate several alternatives in accordance with the present disclosure. However, it is to be understood that the following is only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Metal Particles with Various Metal Cores and Metal Thin Metal Layers

Various metal cores are coated with various thin metal layers by an evaporation or sputter process. The metal particle structures, particle sizes, layer thicknesses, and metal melting temperatures are shown in Table 1, as follows:

The total particle size is given in Table 1 rather than the particle size of the metal core, but in many examples, the metal core can have a very similar particle size relative to the total particle size when the thin metal coating has an average thickness in the nm order or magnitude compared to the micron-sized metal cores that can be used.

Figure 8:
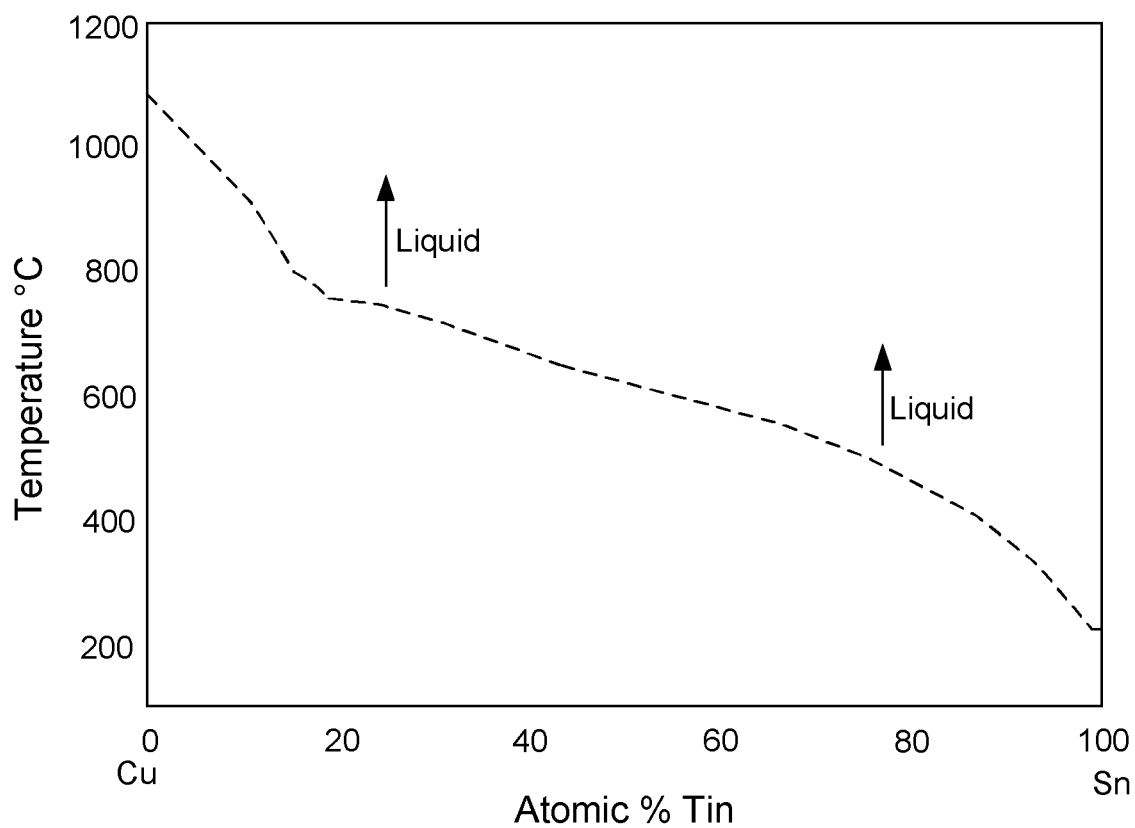
FIG. 8 is an example phase diagram depicting melting temperature modification that may exist at various alloy ratios of two metals in accordance with the present disclosure.

FIG. 8 provides an example partial phase diagram depicting the melting temperature modification that may exist at various alloy ratios of two metals. As a note, in a complete phase diagram, there may be more complicated interactions between the two metals shown below the melting point dashed line provided in FIG. 8. With specific reference to melting point ($T_{melt}$) of Metal Particle 1 from Table 1, copper and tin can be considered. As can be seen, at different atomic percentages of copper relative to tin, the melting temperature can be modified. Thus, in this example, the thin metal layer (tin) can be heated and diffuse into the metal core (copper) to form a diffusion alloy of copper and tin (a binary compound), thus lowering the melting temperature at or near the surface of the metal particle. By lowering the melting temperature, the temperature at which adjacent particles can be sintered together can likewise be reduced.

A similar type of curve can likewise be provided for copper and iron (a major metal present in stainless steel) with respect to Metal Particle 2, as well as for zinc and iron for Metal Particle 3 (See Table 1). Those curves may look different than the melting temperature curve shown in FIG. 8 for the copper/tin diffusion alloys; but nevertheless, those respective curves can likewise be used to design a metal particle with sintering properties that may favorably occur at lower temperatures than with stainless steel particles without a thin metal layer thereon. For example, as a copper thin metal layer diffuses into the stainless steel, the melting point (relative to the stainless steel) may be reduced by 50° C. to 300° C. or more, for example. Likewise, as zinc diffuses into stainless steel, the melting point (relative to the stainless steel) may be reduced by 50° C. to 500° C. or more.

With respect to Metal Particle 4, the thin metal layer is a ferro-alloy, namely an iron-selenium alloy. Thus, the metal core is an alloy (stainless-steel), and the thin metal layer is also an alloy (iron-selenium alloy). With this unique alloy, at certain ratios, the melting temperature can be suppressed to as low as 500° C., at around an atomic ratio of about Fe:Se of 52:48. At a Fe:Se atomic ratio of about 35:65 to about 12:88, the melting temperature can be relatively low as well, e.g., less than about 1000° C.

With Metal Particle 5, there are two layers on the stainless-steel metal core. The first layer is a copper layer, and the second (outermost) layer is a zinc layer. In this example, polymer binder that may otherwise burn off at around 400 C, for example, can be used without collapsing or three-dimensional part or object sagging during the sintering or annealing process in the oven. Thus, as the binder decom-

| Metal Particle ID | Metal Core Material | Metal Core Melting Point ($T_{melt}$); Total Particle Size (D50) | Thin Metal Layer Material | Thin Metal Layer Melting Point ($T_{melt}$); Avg. Thickness |
|---|---|---|---|---|
| 1 | Copper | 1050° C.; 45 μm | Tin | 235° C.; 400 nm |
| 2 | Stainless Steel | 1550° C.; 35 μm | Copper | 1050° C.; 400 nm |
| 3 | Stainless Steel | 1550° C.; 35 μm | Zinc | 420° C.; 450 nm |
| 4 | Stainless Steel | 1550° C.; 35 μm | Iron-Selenium (ferroalloy) | 235° C.; 300 nm |
| 5 | Stainless Steel | 1550° C.; 35 μm | Copper Layer Zinc Layer | 1050° C.; 350 nm 420° C.; 400 nm | poses, the zinc thin metal layer may start diffusing or melting, thus replacing the binder at or around burnout. As the temperature increases, the copper thin metal layer, and in some examples, the stainless steel can both participate in sintering and formation of connecting bridges between adjacent metal particles.

Example 2—Binder Fluid

An acrylic latex binder fluid is prepared that includes from 10 wt % to 20 wt % acrylic latex binder particles and a liquid vehicle which is predominantly water and other volatiles. This acrylic latex binder fluid is ejectable from a thermal fluid ejector onto powder bed material.

Example 3—Three-Dimensional Printing

A powder bed material of 100 wt % of Metal Particle ID 5 (See Table 1) is spread on a substrate and the acrylic latex binder fluid of Example 2 is printed thereon to form a green part or object layer. The metal particle is a stainless steel with a copper thin metal layer thereon and then further, a zinc metal layer on the copper. Powder bed spreading and acrylic latex binder printing is repeated until a green part or object is formed. The green part or object is removed from the powder bed container and transferred to annealing furnace. The furnace temperature is gradually raised to accommodate first aqueous solvent evaporation (around 100° C. to 150° C.), then melting of the latex binder (around 140° C. to 250° C.). Further temperature increase from 250° C. to 400° C. (in presence of an oxidizing ambient, then a reducing ambient) accommodates a gradual latex burnout and removal of volatile byproducts that are present in the liquid vehicle. At the same time, in-diffusion of the zinc surface in contact with other zinc surfaces form metal bonding and onset of in-diffusion of the zinc into the copper and copper into the stainless steel, also forming a spectrum of solid binary phases with melting temperatures spanning from 420° C. (melting temperature of zinc) to 1050° C. (melting temperature of copper) and 1470° C. (melting temperature of stainless steel). Binary solid phases interacting by solid-state in-diffusion provide sintering of adjacent particles. Further, temperature increase facilitates gradual formation of localized liquid phase points wetting particle surfaces and providing further binding support within the "brown" part, which is the sintered part. This process can be terminated at a selected temperature when the sintered part reaches a suitable level of physical integrity and mechanical strength.

What is claimed is:

1. A material set for three-dimensional printing a metal article, comprising:
    a powder bed material, comprising from 80 wt % to 100 wt % metal particles having a metal core and a metal layer on the core, the metal particles having a D50 particle size distribution value ranging from 4 µm to 150 µm and the metal layer having an average thickness from 20 nm to 2 µm; and
    a binder fluid comprising a binder to adhere a first portion of the powder bed material relative to a second portion of the powder bed material not in contact with the binder fluid, wherein the binder and the first portion of the powder bed material when adhered together form a green three-dimensional object.

2. The material set of claim 1, wherein the binder is a polymer binder or polymerizable binder material.

3. The material set of claim 1, wherein the binder comprises metal oxide nanoparticles, wherein the binder fluid includes water and a reducing agent to reduce the metal oxide nanoparticles when external energy is applied to the binder fluid, and wherein the metal oxide nanoparticles are not chemically reactive with the reducing agent at room temperature.

4. The material set of claim 1, wherein the metal core is aluminum, titanium, copper, cobalt, chromium, nickel, vanadium, tungsten, tungsten carbide, tantalum, molybdenum, magnesium, gold, silver, stainless steel, steel, alloys thereof, or admixtures thereof; and the metal layer is a ferro-alloy or an elemental metal.

5. The material set of claim 1, wherein the metal particles include multiple types of metal layers, which are either present as: i) multiple layers on a single metal core, or ii) single layers on different respective metal cores.

6. The material set of claim 1, wherein a melting temperature of the metal layer in centigrade is from 20% to 90% of a melting temperature of the metal core.

7. The material set of claim 1, wherein upon application of heat to the metal particles, a metal material of the metal layer diffuses into the metal core forming an alloy having a lower melting temperature than the metal core.

8. The material set of claim 7, wherein the alloy also has a melting temperature lower than the metal layer.

9. A method of three-dimensional printing a metal article, comprising:
    spreading a powder bed material to form a powder layer having a thickness of from 20 µm to 400 µm, wherein the powder bed material includes from 80 wt % to 100 wt % metal particles having a metal core and a metal layer on the core, the metal particles having a D50 particle size distribution value ranging from 4 µm to 150 µm and the metal layer having an average thickness from 20 nm to 2 µm;
    selectively binding, with a binder fluid comprising a binder, a first portion of the powder bed material relative to a second portion of the powder bed material not in contact with the binder fluid, wherein the binder and the first portion of the powder bed material when adhered together form a green three-dimensional layer within the powder; and
    building up additional green three-dimensional layers by sequentially repeating the spreading and the selectively binding of the powder bed material until a green three-dimensional metal article is formed.

10. The method of claim 9, wherein selectively binding includes applying pulse energy to the powder bed material after ejecting to form the green layer prior to spreading an additional layer of powder bed material.

11. The method of claim 9, further comprising heat fusing the green three-dimensional object to sinter or anneal the metal particles together.

12. The method of claim 9, further comprising heat fusing the green three-dimensional object at a temperature to cause a metal material of the metal layer to diffuse with the metal core forming a diffusion alloy having a lower melting temperature than the metal core.

13. The method of claim 9, wherein the metal particles include multiple types of metal layers, which are either present as: i) multiple layers on a single metal core, or ii) single layers on different respective metal cores.

14. A three-dimensional printing system, comprising:
    the powder bed material of claim 1 and the binder fluid of claim 1;
    a powder bed for receiving the powder bed material; and
    a fluid ejector to selectively deposit a binder fluid onto the powder bed material contained in the powder bed.

15. The three-dimensional printing system of claim 14, wherein the metal core is aluminum, titanium, copper, cobalt, chromium, nickel, vanadium, tungsten, tungsten carbide, tantalum, molybdenum, magnesium, gold, silver, stainless steel, steel, alloys thereof, or a mixture thereof; the metal layer is an elemental metal or a ferro-alloy; and a melting temperature of the metal layer in centigrade is from 20% to 90% of a melting temperature of the metal core.

16. The material set of claim 1, wherein the metal core is stainless steel.

17. The material set of claim 1, wherein the metal particles include multiple types of metal layers on a single metal core.

18. The material set of claim 17, wherein melting temperatures of the metal layers and the metal core ascend from an outermost metal layer to the metal core.

* * * * *